(12) United States Patent
Kim et al.

(10) Patent No.: US 8,293,138 B2
(45) Date of Patent: Oct. 23, 2012

(54) PARTIALLY SULFONATED POLYBENZIMIDAZOLE BASED POLYMER, METHOD FOR PREPARING THE SAME, MEA FOR FUEL CELL USING THE POLYBENZIMIDAZOLE BASED POLYMER AND METHOD FOR PREPARING THE SAME

(75) Inventors: Hyoung-Juhn Kim, Suwon-si (KR);
Jeung Woo Lee, Busanjin-gu (KR);
Tae-Hoon Lim, Seoul (KR); Suk Woo Nam, Seoul (KR); Seong-Ahn Hong, Seoul (KR); In-Hwan Oh, Seoul (KR);
Hyung Chul Ham, Seoul (KR);
Sang-Yeop Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1342 days.

(21) Appl. No.: 12/004,274

(22) Filed: Dec. 19, 2007

(65) Prior Publication Data
US 2008/0241627 A1    Oct. 2, 2008

(30) Foreign Application Priority Data

Dec. 22, 2006   (KR) .................. 10-2006-0132940

(51) Int. Cl.
*H01B 1/12*    (2006.01)
*C08G 73/06*    (2006.01)

(52) U.S. Cl. ........ 252/500; 528/423; 525/535; 525/540; 525/541; 429/493

(58) Field of Classification Search .................. 252/500; 528/423; 525/535, 540, 541; 429/493
See application file for complete search history.

(56) References Cited

U.S. PATENT DOCUMENTS

| 7,288,603 B2 * | 10/2007 | Sakaguchi et al. ............ 525/411 |
| 7,799,893 B2 * | 9/2010 | Martin .......................... 528/423 |
| 2004/0062969 A1 * | 4/2004 | Sakaguchi et al. ............ 429/33 |
| 2004/0149965 A1 | 8/2004 | Otsuki et al. |

FOREIGN PATENT DOCUMENTS

| JP | 2003-327826 | 5/2002 |
| WO | WO 2006051064 A1 * | 5/2006 |

OTHER PUBLICATIONS

CAS reg. No. 91-95-2, Nov. 16, 1984.*
CAS reg. No. 22326-31-4, Nov. 16, 1984.*
CAS reg. No. 121-91-5, Nov. 16, 1984.*
English translation of JP 2003-327826, Nov. 19, 2003.*
Qing et al., "Synthesis and characterization of thermally stable sulfonated polybenzimidazoles," *European Polymer Journal* (2005) 41: 1589-1595.
Kim et al., "PBI Derivatives: Polymer electrolyte fuel cell membrane for high temperature operation," *J. Ind Eng. Chem.* (2004) 10 (7): 1081-1085.

* cited by examiner

*Primary Examiner* — Douglas McGinty
(74) *Attorney, Agent, or Firm* — Merchant & Gould P.C.

(57) ABSTRACT

A partially sulfonated polybenzimidazole based polymer for fuel cell membrane is prepared by copolymerizing monomers of 3,3'-diaminobenzidine, isophthalic acid and 5-sulfoisophthalic acid to obtain a partially sulfonated polybenzimidazole, and doping the partially sulfonated polybenzimidazole with inorganic acid.

4 Claims, 3 Drawing Sheets

PARTIALLY SULFONATED POLYBENZIMIDAZOLE BASED POLYMER, METHOD FOR PREPARING THE SAME, MEA FOR FUEL CELL USING THE POLYBENZIMIDAZOLE BASED POLYMER AND METHOD FOR PREPARING THE SAME

BACKGROUND OF THE INVENTION

1. Field of the Invention

The invention relates to a partially sulfonated polybenzimidazole based polymer, method for preparing the same, a membrane electrode assembly for fuel cell using the polybenzimidazole based polymer and method for preparing the same.

2. Description of the Related Art

Polybenzimidazole based polymers are being studied for replacing the Nafion®-type perfluorosulfonic acid in a field of fuel cell membrane.

Some polybenzimidazole based polymers such as poly[2, 2-(m-phenylene)-5,5-bibenzimidazole] (PBI) or poly[2,5-benzimidazole] (ABPBI) are doped with inorganic acids for improving their mechanical strength or chemical stability.

However, the cell performance using the polybenzimidazole based polymers are still low compared to those using the Nafion®-type perfluorosulfonic acid.

SUMMARY OF THE INVENTION

There is provided a method for preparing a partially sulfonated polybenzimidazole based polymer comprising: copolymerizing monomers comprising 3,3'-diaminobenzidine, isophthalic acid and 5-sulfoisophthalic acid to obtain a partially sulfonated polybenzimidazole; and doping the partially sulfonated polybenzimidazole with inorganic acid.

There is provided a partially sulfonated polybenzimidazole based polymer, the partially sulfonated polybenzimidazole based polymer being doped with inorganic acid and having a following chemical formula 1.

[Chemical Formula 1]

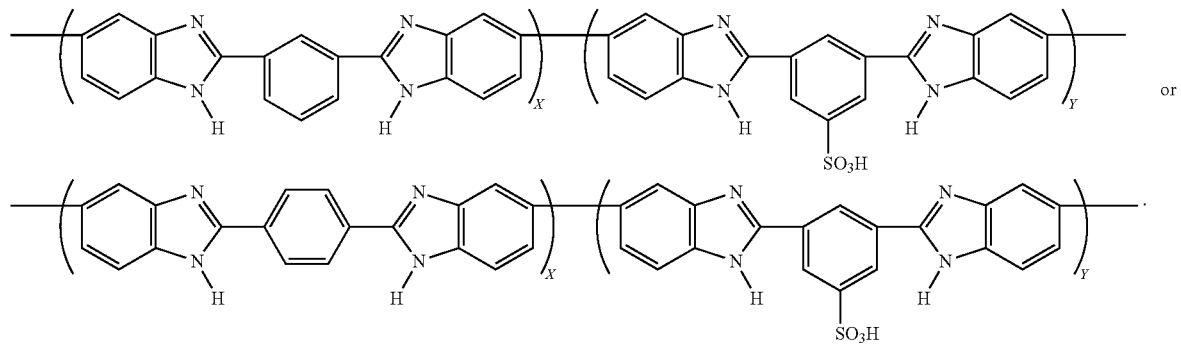

There is provided a method for preparing an MEA for fuel cell using a partially sulfonated polybenzimidazole based polymer, comprising the steps of: copolymerizing monomers comprising 3,3'-diaminobenzidine, isophthalic acid and 5-sulfoisophthalic acid to obtain a partially sulfonated polybenzimidazole based polymer; preparing membrane using the partially sulfonated polybenzimidazole based polymer; and doping the partially sulfonated polybenzimidazole based polymer with inorganic acid.

There is provided an MEA for fuel cell using a partially sulfonated polybenzimidazole based polymer, the partially sulfonated polybenzimidazole based polymer being doped with inorganic acid and having a following chemical formula 1.

[Chemical Formula 1]

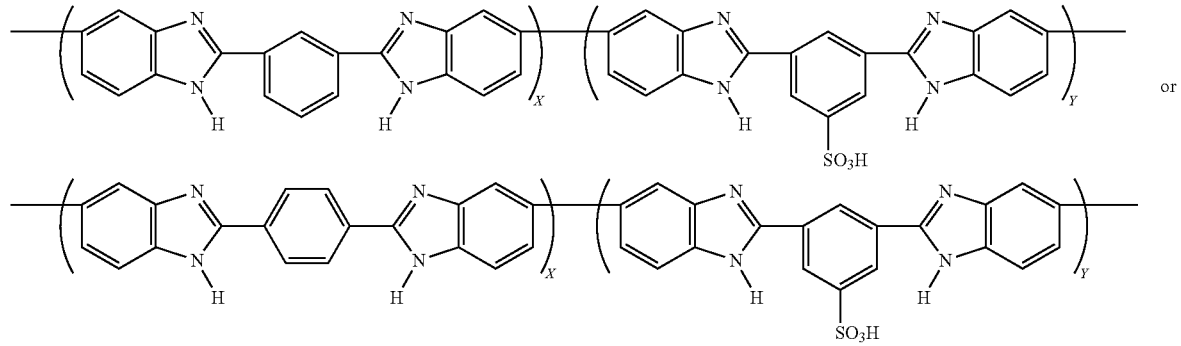

DETAILED DESCRIPTION OF THE INVENTION

Hereinafter, embodiments of the present invention will be described in detail.

According to an embodiment of the invention, 5-sulfoisophthalic acid is copolymerized with 3,3'-diaminobenzidine and isoptalic acid so that a partially sulfonated polybenzimidazole based polymer is prepared. Herein, in the copolymerization, 3,4-diaminobenzoic acid can be further added to be used as a monomer for the copolymerization.

The partially sulfonated polybenzimidazole based polymers copolymerized from such monomers have proper molecular weights to be doped with inorganic acids. Further, the partially sulfonated polybenzimidazole based polymers have improved dimensional stability. Therefore, there is no worry that the size of the polybenzimidazole based polymer would be decreased after they are doped with the inorganic acids, which means that they can be used for fuel cell membrane working even at a high temperature (for example, 100~200° C.) and non-humidified condition, and fuel cell performance, especially the long term performance using the polybenzimidazole based polymers can be increased.

Figure 1:
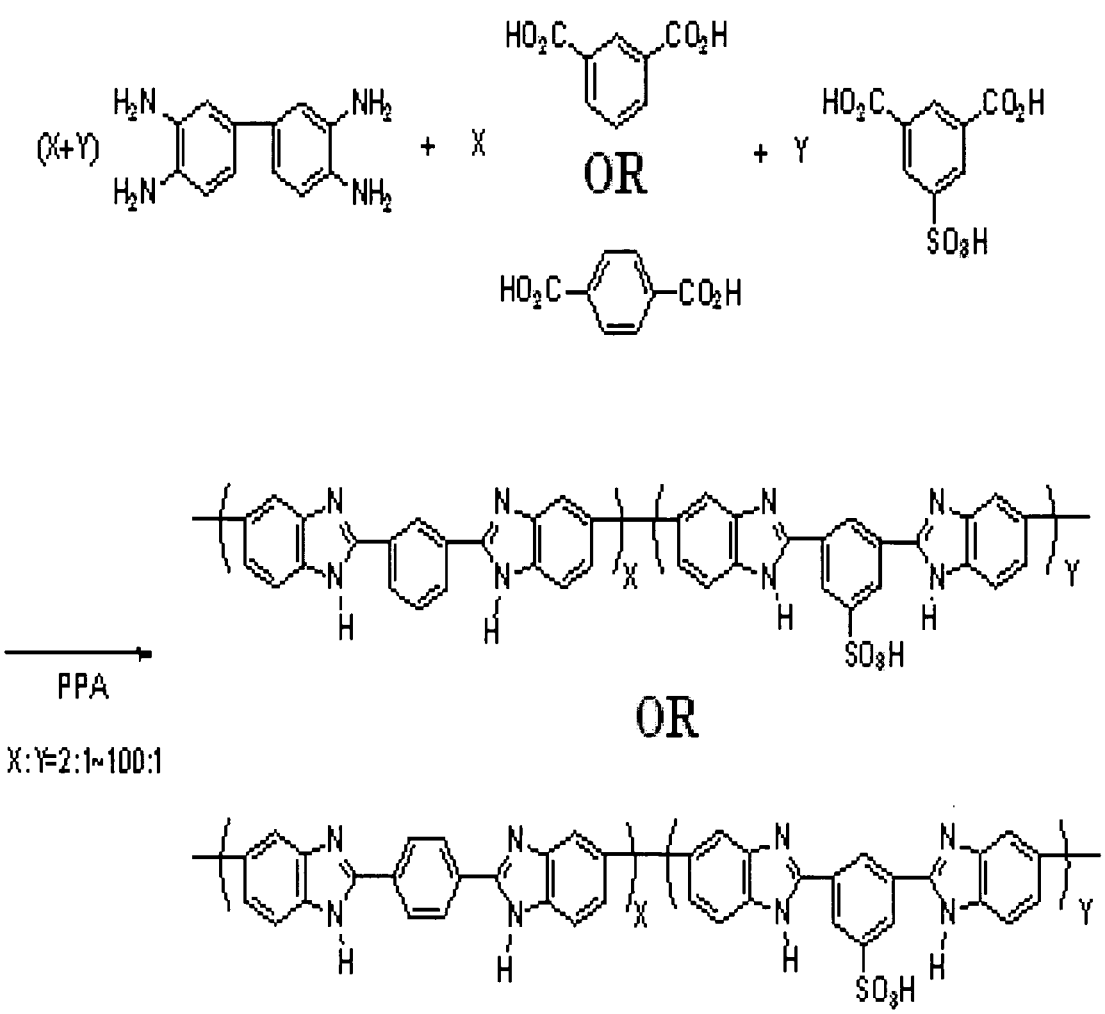
FIG. 1 shows a synthesis reaction of a partially sulfonated polybenzimidazole based polymer according to an embodiment of the invention.

FIG. 1 shows a synthesis reaction of a partially sulfonated polybenzimidazole based polymer according to an embodiment of the invention.

As shown in FIG. 1, a partially sulfonated polybenzimidazole copolymer was prepared by polymerizing 3,3'-diaminobenzidine and isophtalic acid together with 5-sulfoisophthalic acid.

In FIG. 1, ratio of X and Y is preferably 2:1 to 100:1. In case that Y is more beyond the ratio of 2:1, prepared polymer can be solved in water or phosphoric acid. Further, in case that Y is less beyond the ratio of 100:1, effects of the introduction of sulfonic acid to polybenzimidazole based polymer can be decreased.

Figure 2:
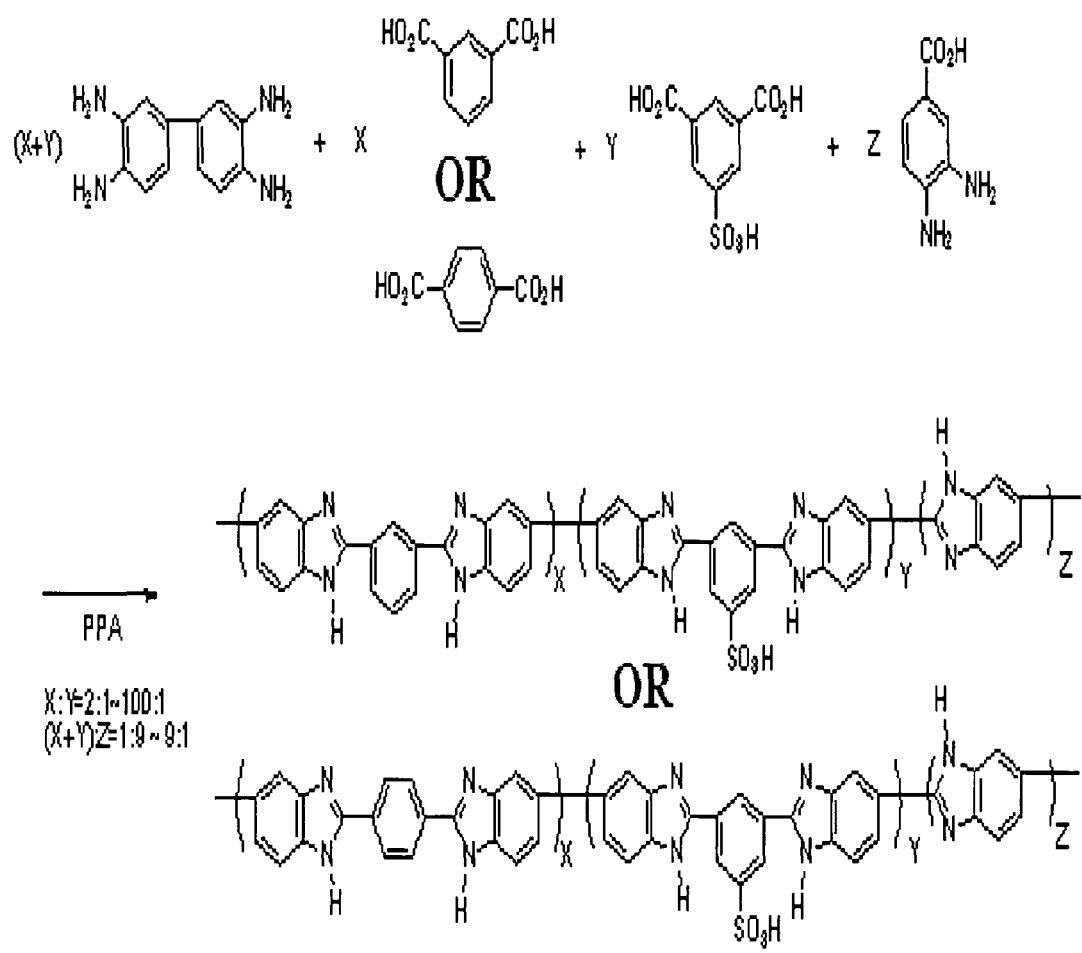
FIG. 2 shows a synthesis reaction of a partially sulfonated polybenzimidazole based polymer according to another embodiment of the invention.

FIG. 2 shows a synthesis reaction of a partially sulfonated polybenzimidazole based polymer according to another embodiment of the invention.

As shown in FIG. 2, a partially sulfonated polybenzimidazole copolymer was prepared by polymerizing 3,3'-diaminobenzidine, isophtalic acid and 3,4-diaminobenzoic acid together with 5-sulfoisophthalic acid.

In FIG. 2, ratio of (X+Y) and Z is preferably 1:9: to 9:1. In case that Z is more beyond the ratio of 1:9, prepared polymer can be solved in water or phosphoric acid. Further, in case that Z is less beyond the ratio of 9:1, effects of the introduction of sulfonic acid to polybenzimidazole based polymer can be decreased.

By using the partially sulfonated polybenzimidazole based polymer, a membrane for fuel cell can be prepared. Herein, the acid doping can be carried out after making a membrane. Further, the acid doping can be carried out during making a membrane in situ, which method is useful for improving the dimensional stability and fuel cell performance.

Example 1

Preparation of Partially Sulfonated Polybenzimidazole 3,3'-diaminobenzidine (12 g), isophthalic acid (8.37 g) and 5-sulfoisophthalic acid (1.25 g) were mixed with polyphosphoric acid and then reacted at 220° C. for 25 hours. Mechanical overheated stirrer was used for the stirring. As the reaction proceeds, the color of the solution changed from ocher to dark brown. Prepared solution was put in water for deposition and a polymer was obtained. Obtained polymer was dried in a vacuum oven for 24 hours. The intrinsic viscosity of the prepared partially sulfonated copolymer powder was 1.2~2.0 dL/g.

Preparation of Membrane Using Partially Sulfonated Polybenzimidazole

The prepared polybenzimidazole copolymer powder (5 g) was solved in DMAc (100 mL). The solution was cast on a glass plate using doctor blade. After being dried in a vacuum oven at 60° C. for 50 hours, polybenzimidazole copolymer membrane was prepared. The prepared membrane was immersed in 60% phosphoric acid for 3 days, thereby obtaining a polymer electrolyte membrane doped in 400%.

In-Situ Preparation of Membrane Using Partially Sulfonated Polybenzimidazole (Example 1)

3,3'-diaminobenzidine (12 g), isophthalic acid (8.37 g) and 5-sulfoisophthalic acid (1.25 g) were put in a 1 L round flask with polyphosphoric acid and then reacted at 220° C. for 25 hours under nitrogen atmosphere. Mechanical overheated stirrer was used for the stirring. As the reaction proceeds, the color of the solution changed from ocher to dark brown. Partially sulfonated polybenzimidazole solution synthesized as above was cast on a clean glass plate using doctor blade. The cast membrane was put at 25° C. and under 40±5% humidity for 1 day. Polyphosphoric acid was changed into phosphoric acid due to moisture in air so that polymer membrane having an acid doping level of 2000 or more was obtained. Thickness of the obtained membrane was 200 to 600 μm.

Comparative Example 1

Synthesis of Polybenzimidazole Comparative to Example 1 and Preparation of Membrane 3,3'-diaminobenzidine (12 g) and isophthalic acid (9.3 g) were put in a 1 L round flask with polyphosphoric acid and then reacted at 220° C. for 25 hours under nitrogen atmosphere. The polybenzimidazole of the comparative example was not partially sulfonated. Mechanical overheated stirrer was used for the stirring. Setting the stirring velocity to be 100 RPM at room temperature, the viscosity of the polyphosphoric acid was decreased according to the increase of temperature. To this end, the stirring velocity was increased up to 300 RPM and then, as the reaction proceeds and the viscosity of the solution was increased, the stirring velocity finally reached 180~200 RPM. Further, as the reaction proceeds, the color of the solution changed from ocher to dark brown. The prepared solution was put in water for deposition and a polymer was obtained. Obtained polymer was dried in a vacuum oven of 100° C. for 24 hours so that polybenzimidazole having intrinsic viscosity of 1.5~3.0 Dl/g was prepared. Prepared polybenzimidazole (5 g) was solved in DMAc (100 mL). The solution was cast on a glass plate using doctor blade. After being dried in a vacuum oven at 60° C. for 50 hours, polybenzimidazole membrane was prepared. The prepared membrane was immersed in 60% phosphoric acid for 3 days, thereby obtaining a polymer electrolyte membrane doped in 400%.

Example 2

Preparation of Partially Sulfonated Polybenzimidazole 3,3'-diaminobenzidine (12 g), isophthalic acid (8.37 g), 3,4-diaminobenzoic acid (15 g) and 5-sulfoisophthalic acid (1.25 g) were mixed with polyphosphoric acid and then reacted at 220° C. for 25 hours. Mechanical overheated stirrer was used for the stirring. As the reaction proceeds, the color of the solution changed from ocher to dark brown. Prepared solution was put in water for deposition and a polymer was obtained. Obtained polymer was dried in a vacuum oven for 24 hours. The intrinsic viscosity of the prepared partially sulfonated copolymer powder was 1.2~2.0 dL/g.

Preparation of Membrane Using Partially Sulfonated Polybenzimidazole

The prepared polybenzimidazole copolymer powder (5 g) was solved in DMAc (100 mL). The solution was cast on a glass plate using doctor blade. After being dried in a vacuum oven at 60° C. for 50 hours, polybenzimidazole copolymer membrane was prepared. The prepared membrane was immersed in 60% phosphoric acid for 3 days, thereby obtaining a polymer electrolyte membrane doped in 400%.

In-Situ Preparation of Membrane Using Partially Sulfonated Polybenzimidazole (Example 2)

3,3'-diaminobenzidine (12 g), isophthalic acid (8.37 g), 3,4-diaminobenzoic acid (15 g) and 5-sulfoisophthalic acid (1.25 g) were put in a 1 L round flask with polyphosphoric acid and then reacted at 220° C. for 25 hours under nitrogen atmosphere. Mechanical overheated stirrer was used for the stirring. As the reaction proceeds, the color of the solution changed from ocher to dark brown. Partially sulfonated polybenzimidazole solution synthesized as above was cast on a clean glass plate using doctor blade. The cast membrane was put at 25° C. and under 40±5% humidity for 1 day. Polyphosphoric acid was changed into phosphoric acid due to moisture in air so that polymer membrane having an acid doping level of 2000 or more was obtained. Thickness of the obtained membrane was 200 to 600 μm.

Comparative Example 2

Synthesis of Polybenzimidazole Comparative to Example 2 and Preparation of Membrane 3,3'-diaminobenzidine (12 g), isophthalic acid (9.3 g) and 3,4-diaminobenzoic acid (15 g) were put in a 1 L round flask with polyphosphoric acid and then reacted at 220° C. for 25 hours under nitrogen atmosphere. The polybenzimidazole of the comparative example was not partially sulfonated. Mechanical overheated stirrer was used for the stirring. Setting the stirring velocity to be 100 RPM at room temperature, the viscosity of the polyphosphoric acid was decreased according to the increase of temperature. To this end, the stirring velocity was increased up to 300 RPM and then, as the reaction proceeds and the viscosity of the solution was increased, the stirring velocity finally reached 180~200 RPM. Further, as the reaction proceeds, the color of the solution changed from ocher to dark brown. The prepared solution was deposited in water and a polymer was obtained. Obtained polymer was dried in a vacuum oven of 100° C. for 24 hours so that polybenzimidazole having intrinsic viscosity of 1.5~3.0 Dl/g was prepared. Prepared polybenzimidazole (5 g) was solved in DMAc (100 mL). The solution was cast on a glass plate using doctor blade. After being dried in a vacuum oven at 60° C. for 50 hours, polybenzimidazole membrane was prepared. The prepared membrane was immersed in 60% phosphoric acid for 3 days, thereby obtaining a polymer electrolyte membrane doped in 400%.

[Preparation of MEA and Cell]

MEAs were prepared using the membrane of example 1, which was prepared in-situ, and the membrane of comparative example 1. Attaching GDL to the MEAs, unit cells were prepared without hot pressing. Performances of the unit cells were tested.

[Test of Cell Performance]

Figure 3:
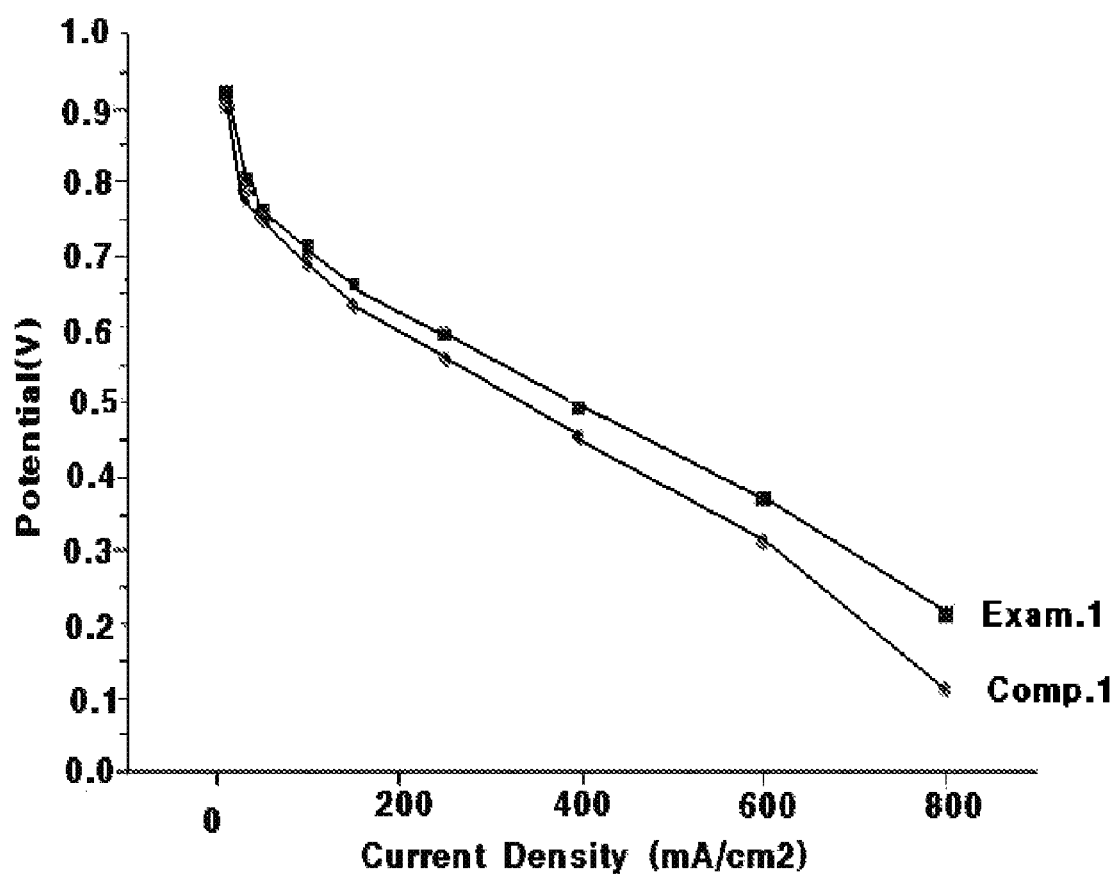
FIG. 3 is a performance (I-V) graph of a cell using the partially sulfonated polybenzimidazole according to the example 1 of the invention.

FIG. 3 is a performance (I-V) graph of cell using the partially sulfonated polybenzimidazole according to the example 1 of the invention. Herein, doping level was 400%, working temperature was 150° C. and working condition was $H_2$/Air. In FIG. 3, ● indicated the unit cell using the membrane of the comparative example 1 and ■ indicates the unit cell using the membrane of the example 1.

As shown in FIG. 3, contrary to the comparative example 1, there was increase of performance in case of the example 1. That is, since sulfonic acid was partially introduced to polybenzimidazole in case of example 1, dimensional stability was increased and thus the performance was improved.

As described above, dimensional stability of polybenzimidazole based polymer doped with inorganic acid was increased especially in high temperature so that fuel cell using the polybenzimidazole based polymer can show improved cell performance compared to the prior polybenzimidazole.

What is claimed is:

1. A method for preparing a partially sulfonated polybenzimidazole based polymer comprising:
    copolymerizing monomers comprising 3,3'-diaminobenzidine, isophthalic acid and 5-sulfoisophthalic acid to obtain a partially sulfonated polybenzimidazole; and
    doping the partially sulfonated polybenzimidazole with inorganic acid;
    wherein the polymer has the following chemical formula 1, wherein X:Y ratio is 2:1~100:1, and wherein the polymer has an acid doping level of 2000 or more

[Chemical Formula 1]

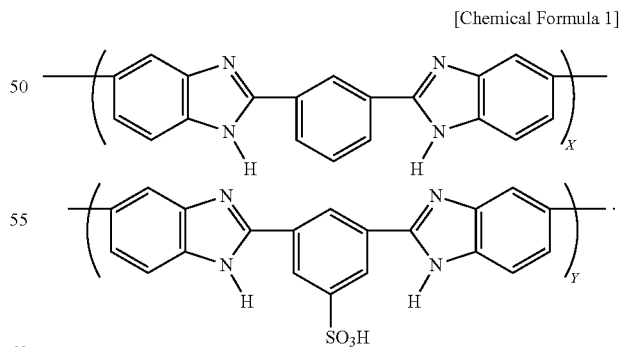

2. The method of claim 1, wherein 3,4-diaminobenzoic acid is further added to be used as a monomer for the copolymerization; and
    wherein the polymer has the following chemical formula 2, wherein X:Y ratio is 2:1~100:1 and (X+Y):Z ratio is 1:9~9:1

[Chemical Formula 2]

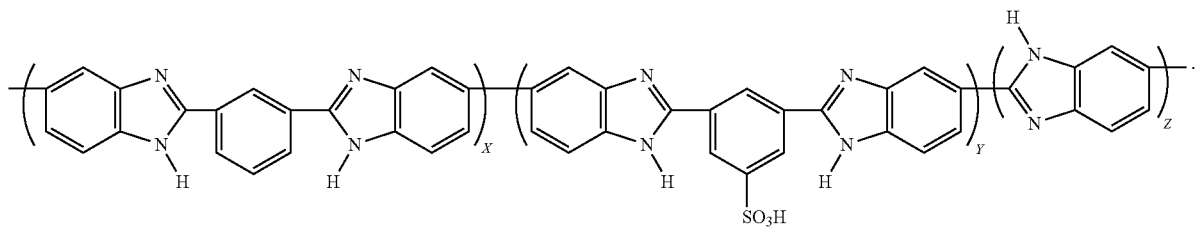

3. A partially sulfonated polybenzimidazole based polymer prepared by the method of claim 1, the partially sulfonated polybenzimidazole based polymer being doped with inorganic acid and having a following chemical formula 1

[Chemical Formula 1]

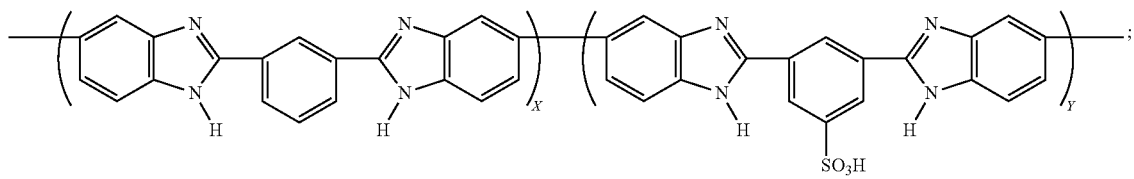

wherein X:Y ratio is 2:1~100:1, and
wherein the polymer has an acid doping level of 2000 or more.

4. A partially sulfonated polybenzimidazole based polymer prepared by the method of claim 2, the partially sulfonated polybenzimidazole based polymer being doped with inorganic acid and having a following chemical formula 2

[Chemical Formula 2]

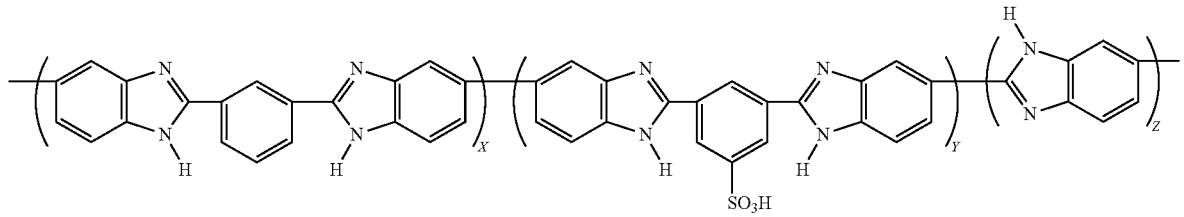

wherein X:Y ratio is 2:1~100:1 and (X+Y):Z ratio is 1:9~9:1, and
wherein the polymer has an acid doping level of 2000 or more.

* * * * *